United States Patent [19]

Rice et al.

[11] Patent Number: 4,960,202
[45] Date of Patent: Oct. 2, 1990

[54] FRICTION CONTROL FOR BEARING SURFACE OF ROLLER

[75] Inventors: Edwin E. Rice, Ann Arbor; Hugh R. Norris, Howell, both of Mich.

[73] Assignee: Ingersoll-Rand Company, Woodcliff Lake, N.J.

[21] Appl. No.: 355,813

[22] Filed: May 17, 1989

Related U.S. Application Data

[63] Continuation of Ser. No. 3,135, Jan. 14, 1987, abandoned.

[51] Int. Cl.$^5$ .............................................. B65G 13/06
[52] U.S. Cl. ..................................... 198/781; 198/500; 384/292; 384/398
[58] Field of Search ....................... 198/781, 500, 501; 384/398, 292, 373

[56] References Cited

U.S. PATENT DOCUMENTS

| 143,950 | 10/1873 | Allen | 384/292 X |
|---|---|---|---|
| 2,673,131 | 3/1954 | Kistler | 384/292 X |
| 2,980,475 | 4/1961 | Wolfe | 384/292 X |
| 4,120,544 | 10/1978 | Hüber | 384/292 |
| 4,193,493 | 3/1980 | Ekstraud | 198/781 |
| 4,314,629 | 2/1982 | Shilander et al. | 198/500 |
| 4,331,228 | 5/1982 | Galarowic | 198/781 X |
| 4,366,899 | 1/1983 | Doro | 198/781 |
| 4,524,861 | 6/1985 | Matsushita | 198/781 |
| 4,577,747 | 3/1986 | Martin | 198/500 |
| 4,671,676 | 6/1987 | Chen et al. | 384/292 X |

Primary Examiner—Joseph E. Valenza
Assistant Examiner—D. Glenn Dayoan
Attorney, Agent, or Firm—Walter C. Vliet; Robert F. Palermo; Arthur N. Trausch

[57] ABSTRACT

A roller element for a powered-roller tarnsfer system has a plurality of lubricant pressure relief areas about or in the bearing surface to increase and provide consistent rotary drive power transmitted from a powered axle to the roller.

2 Claims, 1 Drawing Sheet

FRICTION CONTROL FOR BEARING SURFACE OF ROLLER

This application is a continuation of application Ser. No. 07/003,135, filed Jan. 14, 1987 now abandoned.

This invention relates to the roller element of a powered-roller transfer line, and more particularly to the apparatus and method embodied by a roller having a plurality of lubricant pressure relief areas in or about the bearing surface to provide consistent and increased rotary power transmission from a powered axle to the roller.

BACKGROUND OF THE INVENTION

For certain automotive components such as engines or transmissions, powered roller transfer lines are used to move workpieces through the manufacturing and assembly stations. Workpieces are mounted on pallets which are carried through the line by rollers driven by slow but continuously rotating axles. The rollers have a lubricated bushing-type inner diameter bearing surface adapted to fit on the axles. To propel the pallets, the powered axles cause the rollers to rotate by using the friction between the axle and the bearing surface of the roller. At certain positions on the transfer line, it is desired to stop the pallets. At these intended stopping points, a stopping mechanism physically restrains the pallet. The rollers under the stopped pallet also stop rotating and slip on the rotating axles. This slipping is facilitated by the lubricant between the axle and the bearing surface of the roller.

The driving force to accelerate a pallet from a stopping point or to drive a pallet past a minor resistance such as a small change in elevation is determined by the coefficient of friction between the powered axle and the inner diameter bearing surface of the roller. The coefficient of friction in turn is affected by the lubrication condition existing between the axle and the bearing surface of the roller. The desired lubrication mode for the powered-roller in the transfer line described above is boundary lubrication.

Under some working conditions however, additional lubricant from the work process or the environment may gradually enter the bearing gap. The additional lubricant changes the lubricant mode from boundary to hydrodynamic. Hydrodynamic lubrication substantially reduces the friction between the roller and powered axle. Therefore the driving force transmitted from the axles to the rollers is substantially reduced. The reduced driving force provided by the rollers to the pallets causes the pallets to improperly accelerate and move inconsistently. This is undesirable in automated manufacturing and assembly lines.

SUMMARY OF THE INVENTION

An object of this invention is to maintain at a consistent and acceptable level the drive force transmitted to a roller from a powered axle.

Another object is to maintain an acceptably high coefficient of friction between the powered axle and the roller.

Another object is to prevent additional lubricant in the bearing gap of a roller from causing undesired transition from boundary to hydrodynamic lubrication.

Another object is to relieve lubricant pressure locally from about the bearing surface by providing lubricant pressure relief areas so as to maintain boundary lubrication about the bearing surface and thus maintain a high coefficient of friction between the powered axle and the roller which results in consistent rotary power transmission from the powered axle to the intermittently rotating roller.

The objects and advantages of the present invention are attained by having a plurality of lubricant pressure relief areas about the bearing surface of an annular roller.

An unexpected advantage of the present invention is the increase in drive force transmitted from the powered axle to the roller element under operating conditions with excess lubrication present.

Other objects, advantages and novel features of the present invention will become apparent from the following detailed description of the invention when considered in conjunction with the accompanying drawings.

DETAILED DESCRIPTION OF THE INVENTION

Figure 1:
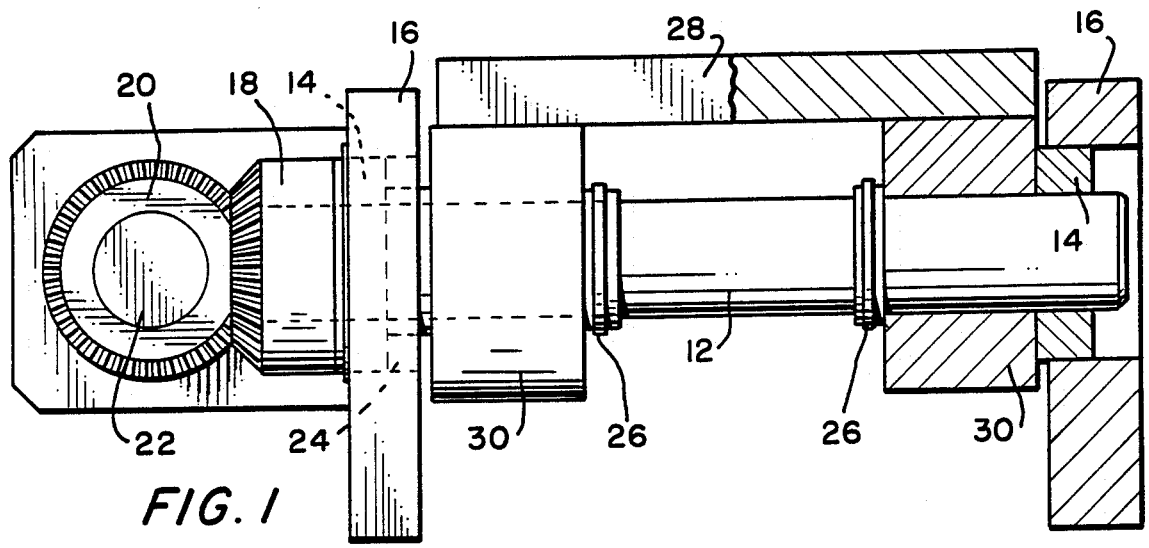
FIG. 1 is a partial cross-sectional elevation view of a portion of a transfer line.

A typical powered axle-roller subassembly of a transfer line is shown in FIG. 1. The axle 12 is support for rotation by bearings 14 in the frame member 16. A bevel gear arrangement 18 and 20 provides constant rotational power to the axle from a power source, such as a motor, connected to drive shaft 22.

Figure 2:
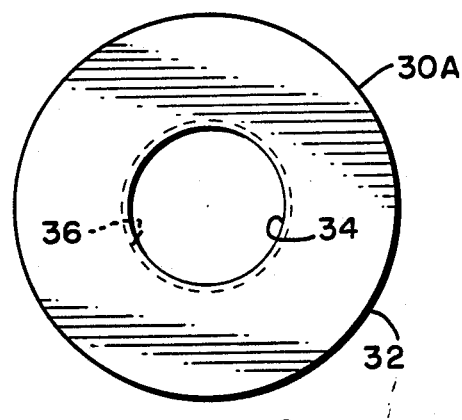
FIG. 2 is front view of the roller.

Two rollers 30 are mounted on the axle in the transfer line shown in FIG. 1. A spacer 24 and two collars 26 position the rollers on the axle. Other configurations are possible. A front view of a roller is shown in FIG. 2. The roller is usually a solid metal annular cylinder having outer and inner diameter surfaces. The outer diameter surface 32 provides the roller contact surface to carry a pallet such as 28 in FIG. 1. The inner diameter surface 34 provides a bearing surface for the axle 12. The bearing surface 34 is formed by a bore through the center of the roller and is usually concentric with the outer diameter roller surface.

The inner diameter bearing surface 34 is dimensioned such that a small bearing gap exists between the powered axle 12 and the bearing surface. A lubricant is provided in the bearing gap. In a preferred embodiment, the roller is constructed of a lubricant-impregnated sintered material. Alternatively, lubricant may be introduced into the bearing gap by other conventional means such as a lubricant wick or pump. Another known means of providing lubricant to the bearing gap is by a supply passageway such as a supply groove on the axle or the bearing surface of the roller. A lubricant supply groove has large dimensions and is widely spaced on the axle or roller surfaces so as to best perform its supply function.

In normal operation a roller having a smooth bearing surface operates as follows. The powered axle 12 rotates continuously. A thin film of lubricant occupies the bearing gap between the axle and bearing surface of the roller. The axle rotational speed and other factors are such that the lubricant effect is in the boundary lubrication mode. The coefficient of friction between the axle and the bearing surface of the roller is high. This is well known from the Stribeck curve which relates lubrication mode to coefficient of friction for sliding bearings. Thus the axle causes the roller to rotate and tangentially propel the pallet forward. The coefficient of friction in the boundary lubrication mode is high enough that the drive force supplied by the axle to the roller can overcome any minor resistance a pallet may encounter on the line.

Furthermore, in normal operation, the lubrication about the bearing surface of the roller allows the roller to slip on the axle if the pallet encounters a stiff resistance such as a stopping mechanism. The lubrication in the bearing gap facilitates the continued rotation of the powered axle relative to the stopped roller.

During operation of the line, excess lubrication may gradually enter the bearing gap. The increased lubrication causes the lubrication effect to change from the boundary mode to the hydrodynamic mode. The coefficient of friction between the axle and the roller decreases as the lubrication mode changes from boundary to hydrodynamic lubrication. Again this is known from the Stribeck curve.

In a hydrodynamic lubrication mode, the drive force supplied by the axle to the roller is not strong enough to overcome minor resistance. Thus the rollers begin to slip on the axles and the pallets in the line are subject to inconsistent movement. In other words, when excess lubrication enters the bearing gap the rollers tend to slip on the powered axle rather than drive the pallets.

The present invention overcomes the above problem. Even with excess lubrication, the lubricant can be maintained in the boundary lubrication mode by dividing the bearing surface into narrow lands separated by narrow lubricant pressure relief areas. The recessed relief areas bleed off the excess lubricant pressure and prevents transition to hydrodynamic lubrication. In the preferred embodiment of the roller 30A shown in FIG. 3, and enlarged in FIG. 4, narrow or thin grooves 36 having a substantially circumferential orientation provide localized lubricant pressure bleed off. The grooves preferably are narrow so as not to substantially reduce the bearing area. The bearing lands between the grooves are also relatively narrow but preferably are three to ten times the groove width. This relationship appears important to provide both adequate bearing support area and relief area to bleed off lubricant pressure. It is apparent that these narrow, closely spaced lubricant pressure relief grooves differ substantial in construction, purpose and effect from the large, widely spaced lubricant supply grooves discussed earlier.

Figure 3:
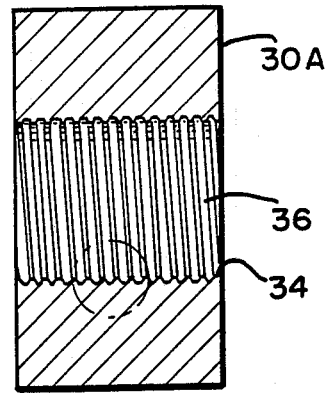
FIG. 3 is a cross-sectional side view of the roller of the present invention.
Figure 4:
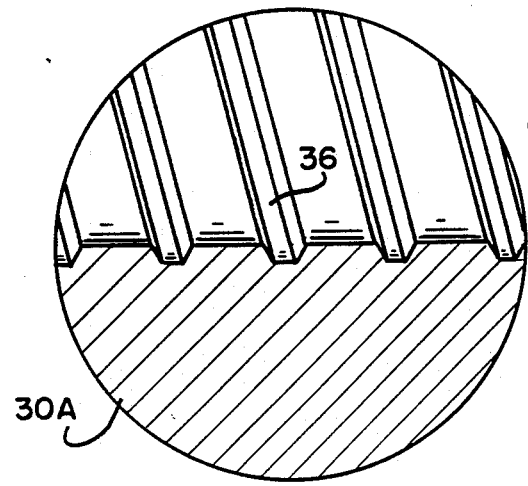
FIG. 4 is an enlargement of the circled portion of the roller in FIG. 3.

A thread-like helical groove on the inner diameter bearing surface of the roller, as shown in FIGS. 3 and 4, is the preferred embodiment for providing lubricant relief areas for the bearing surface of the roller. The groove has a groove root width of about .005", a thread pitch between 0.015" and 0.050", and a thread depth between 0.003" and 0.006". The groove sidewalls have a 60° included angle. A helical thread configuration is preferred due to ease of machining.

Unexpectedly, it was found that dividing the bearing surface into narrow lands surrounded by lubricant pressure relief areas such as circumferential grooves machined into the bearing surface increased the drive force transmitted to the rollers when excess lubricant is present. For example, a new roller having a smooth, ungrooved bearing surface was found to initially generate about 25 lbs. of drive force on a pallet with 450 lbs. of weight. When excess lubrication was introduced into the bearing gap the drive force was reduced to 4-7 lbs.

In the above situation, installing rollers with circumferential grooves machined into the bearing surface as provided by the present invention produced 28-30 lbs. of drive force. When excess lubrication was introduced into the bearing gap, the grooved roller produced 25-30 lbs. of force, about 4 times the drive force transmitted by the smooth ungrooved bearing surface with excess lubricant.

Figure 5:
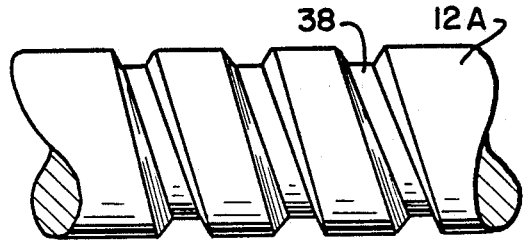
FIG. 5 is another embodiment of the present invention.

Other configurations of lubricant pressure relief areas are possible and are considered within the scope of this invention. Thin axial grooves on the roller inner diameter would also allow the excess lubricant pressure to bleed off. Alternatively, as shown by FIG. 5, axial or circumferential grooves 38 can be provided on the axle 12A, opposite the bearing surface of the roller inner diameter.

Obviously, many modifications and variations of the present invention are possible in light of the above teachings. It is therefore to be understood that, within the scope of the appended claims, the invention may be practiced otherwise than as specifically described.

What we claim is:

1. A friction drive roller for a continuously rotating axle of a conveyor comprising: an annular roller element having an outer diameter surface for rollingly transporting articles on the conveyor and an inner diameter surface for frictional drive contact with the rotating axle; means for reducing the coefficient of friction between said inner diameter surface and said rotating axle when said articles are restrained from movement on the conveyor comprising a small gap between the rotating axle and the inner diameter surface of the roller element and a film of lubricant disposed in the gap so as to substantially prevent the rotating axle from contacting the inner diameter surface; and means for increasing the coefficient of friction between said inner diameter surface and said rotating axle when said articles are free to move on the conveyor comprising a continuous helical groove having circumferential loops spaced three to ten groove widths apart in one of said inner diameter surface and said rotating axle for reducing the lubricant pressure so as to allow frictional drive contact of the rotating axle with the inner diameter surface.

2. The friction drive roller of claim 1 further characterized in that said circumferential loops have a groove root width of 0.005", a thread pitch between 0.015" and 0.050", a thread depth between 0.003" and 0.006" and groove side walls having a 60° included angle.

* * * * *